United States Patent [19]
Rohlfing et al.

[11] Patent Number: 6,034,739
[45] Date of Patent: Mar. 7, 2000

[54] SYSTEM FOR ESTABLISHING A THREE-DIMENSIONAL GARBAGE MATTE WHICH ENABLES SIMPLIFIED ADJUSTING OF SPATIAL RELATIONSHIPS BETWEEN PHYSICAL AND VIRTUAL SCENE ELEMENTS

[75] Inventors: Thomas R. Rohlfing, Salt Lake City; James H. Houskeeper, Draper, both of Utah

[73] Assignee: Evans & Sutherland Computer Corporation, Salt Lake City, Utah

[21] Appl. No.: 08/870,756

[22] Filed: Jun. 9, 1997

[51] Int. Cl.[7] ................................................. H04N 9/74
[52] U.S. Cl. .................... 348/586; 348/578; 348/584; 348/592; 345/420; 345/113; 345/114
[58] Field of Search .................... 348/584–589, 348/566, 576, 577, 592, 598; 345/819, 113, 114, 420, 423, 426, 434

[56] References Cited

U.S. PATENT DOCUMENTS

| | | | |
|---|---|---|---|
| 4,393,394 | 7/1983 | McCoy | 358/22 |
| 4,630,101 | 12/1986 | Inaba et al. | 348/663 |
| 5,196,922 | 3/1993 | Yeomans | 348/577 |
| 5,320,353 | 6/1994 | Suzuki | 273/86 |
| 5,479,597 | 12/1995 | Fellous | 395/154 |
| 5,506,949 | 4/1996 | Perrin | 395/152 |
| 5,659,490 | 8/1997 | Imamura | 364/526 |
| 5,684,943 | 11/1997 | Abraham et al. | 345/114 |
| 5,689,437 | 11/1997 | Nakagawa | 364/514 |

*Primary Examiner*—Andrew I. Faile
*Assistant Examiner*—Reyben M. Brown
*Attorney, Agent, or Firm*—Thorpe, North & Western, LLP

[57] ABSTRACT

A new method and apparatus for creating, positioning and manipulating a garbage matte which obscures everything outside of a three-dimensional physical set or blue stage. Effectively, the garbage matte is a "negative" of a blue stage. What is important is that the garbage matte is created either as a virtual enclosure around all virtual objects in the virtual environment, or simply as a background color of the graphics engine generating the garbage matte. In this way, the garbage matte provides extensions of blue screens which comprise the blue stage, extending all the way around and behind the television cameras. Consequently, a compositor will not include in a composited output image those physical set elements which are masked by the virtual garbage matte. The compositor will replace areas hidden by the garbage matte with image data supplied by the computer image generator which stores the virtual environment. Furthermore, it is now possible to move the virtual location of the physical set (including the television cameras) within the virtual environment without having to readjust the position of the garbage matte relative to the model by anchoring virtual objects together so as to maintain relative position relationships at all times.

35 Claims, 5 Drawing Sheets

SYSTEM FOR ESTABLISHING A THREE-DIMENSIONAL GARBAGE MATTE WHICH ENABLES SIMPLIFIED ADJUSTING OF SPATIAL RELATIONSHIPS BETWEEN PHYSICAL AND VIRTUAL SCENE ELEMENTS

BACKGROUND

1. The Field of the Invention.

This invention relates generally to combining real scene elements from a television-type camera with virtual scene elements from a virtual camera. More specifically, the present invention provides new methods for generating a garbage matte which simplifies proper commingling of real and virtual scene elements so that they appear to be positioned and can be moved relative to each other by utilizing a universal blue/green screen compositor to generate a single picture.

2. The State of the Art

The state of the art of combining real world imagery with additional imagery provided by another source is a process requiring substantial precision. Typically, the other source of additional imagery is computer generated or some other type of synthetic imagery. Precision is required in the placement of synthetic imagery so that the combination appears realistic when viewed as a whole. The combination is typically referred to as a virtual set.

The virtual set to be discussed hereinafter comprises input from a television camera and a virtual camera. The virtual camera is typically implemented utilizing a high performance computer graphics engine, although speed can be sacrificed in achieving high quality output.

The type of computer generated imagery of concern to the present invention is imagery which can be inserted within a scene of real world imagery photographed or filmed by a television camera (where the television camera is generally a source of video data). In this scenario, real world objects are disposed in the foreground in front of a studio backdrop background, commonly constructed using a blue or green wall or screen. A synthetic scene is then added in place of the blue or green screen.

The virtual set described above involves important set-up, calibration and implementation details which are mostly beyond the scope of the present invention. However, to facilitate understanding, the subject matter of two previously filed patent applications titled "METHOD FOR MEASURING CAMERA AND LENS PROPERTIES FOR CAMERA TRACKING", and "CAMERA/LENS CALIBRATION APPARATUS AND METHOD", both of which were filed on Apr. 4, 1997, are hereinafter incorporated by reference.

The patent applications described above teach that as long as a position, an orientation, and a field of view of the physical television camera are monitored and duplicated by the virtual camera, the real and virtual scene elements appear to move together, and are properly "co-mingled" or combined in a virtual set. An issue that is not addressed, however, is the matter of masking objects. It is important to understand that those objects or other scene elements which the television camera can view but which are not to be part of a composited picture are covered from view of the television camera by utilizing a garbage matte.

Garbage mattes have been used for years to hide or mask objects from the field of view of the television camera, as will be explained. In the context of the present invention, physical scene elements are typically placed on a physical set which is painted blue or green. In the physical set, the floor, backdrop, and possibly side walls are painted a uniform blue. This is referred to as a blue stage. Physical scene elements typically include live talent (actors), chairs, desks, plants or any other "real" props with which the live talent can interact.

Virtual scene elements are built using computer modeling tools known to those skilled in the art. The computer modeling tools are utilized to "create" geometric shapes, texture patterns, lighting effects, and other special effects, in order to create a desired virtual environment. These virtual scene elements are stored as digital data until they are retrieved to become part of the virtual set. It should be mentioned that the position and orientation of each item in the virtual environment is modeled relative to a coordinate system selected for modeling.

It is an important realization that motivation for the present invention comes from a desire and need to often adjust the position and orientation of the physical blue stage relative to the virtual environment. In essence, the effect is to "grab" the physical set (including the television cameras) and "place" it in any desired position and orientation relative to the virtual environment.

In the process of combining the virtual environment (and thus the virtual set) with the physical set, a "tool" which is often employed by those skilled in the art is the previously mentioned garbage matte. The garbage matte receives its name from the function it performs of hiding undesirable physical scene elements which might at times be in the television camera's field of view, but which are not supposed to be seen within the composited output image (showing the virtual set instead).

It should be obvious that lights above a physical stage should not be included in the composited output image. However, because the stage lights are not blue, they will undesirably appear as part of the virtual set. Therefore, a garbage matte is utilized to eliminate the stage lights or other undesirable physical structures from the virtual set. If the garbage matte is "real," for example, it can be a piece of cardboard which is cut to the desired shape and painted blue.

However, in the case where the garbage matte is virtual, then it is often constructed in the virtual environment using one or more polygons generated by the computer modeling tools or some other polygon generating tool running in a computer image generator. The polygons indicate directions where the television camera's picture should not contribute to a composited picture. In other words, the polygons hide or mask physical objects. Therefore, in any direction where the garbage matte is seen in a compositor, the composited output image is taken from the virtual environment and not the physical set, regardless of whether the television camera sees blue or not.

A common example of the utilization of a garbage matte is the obvious case where the television camera pans beyond the limits of the blue stage, thus revealing lights, props, studio personnel, or other objects just beyond the walls of the physical set. Because the compositor "sees" these objects as not being blue, they would normally be passed to the composited output image. Therefore, without a garbage matte, it is not possible to pan the television camera beyond the limits of the physical set which has not been colored blue, or hidden behind blue walls. It should be apparent that even if a full wrap-around physical blue set were created, there would necessarily be overhead lights which should be masked off, requiring the use of a garbage matte.

The information above has been directed to use of the garbage matte. What has not been discussed is the creation of a garbage matte. The state of the art methods for creating and positioning an effective garbage matte are generally tedious and time consuming.

For example, it is common to construct a simple garbage matte polygon using a real two-dimensional polygon cutout. The shape of the cutout approximates the shape of the physical set blue stage as seen from a particular television camera location. Unfortunately, a two-dimensional cutout only works well from a narrow range of selectable television camera positions. Furthermore, the two-dimensional cutout can't obscure areas behind the television camera's position at all. Consequently, it is generally necessary to move the garbage matte to different positions and orientations for different television camera positions. It becomes readily apparent that the creation, moving and repositioning of garbage mattes can rapidly become a time consuming and thus costly procedure. Furthermore, the problem is only compounded if the television camera must be moved so as to view the blue stage from a different perspective.

It would therefore be an improvement over the state of the art to provide a new method for utilizing garbage mattes within a virtual set, where the method enables more practical creation, movement and repositioning of garbage mattes. It would also be an improvement to provide real-time manipulation of the garbage mattes which would enable rapid deployment of the system for use in modern virtual sets. Preferably, the garbage matte would obscure everything around the blue stage, both in front of and behind the television cameras. In this way, no matter where the television camera turns, if objects seen by the television camera include physical elements which are not intended to be seen (such as props), the garbage matte would hide those objects.

It would also be an improvement if the position and orientation of the garbage matte could be anchored to the blue stage's position and orientation. In this way, the garbage matte would not require readjustment when the blue stage's virtual location is changed within the virtual environment.

OBJECTS AND SUMMARY OF THE INVENTION

It is an object of the present invention to provide a method and apparatus for low-cost implementation of a virtual set which utilizes a three-dimensional garbage matte.

It is another object to provide a method and apparatus for creating a "universal" garbage matte which can be utilized with the geometry of any physical set.

It is another object to provide a method and apparatus for establishing and then manipulating the spatial relationships between physical set elements and virtual elements within the virtual environment.

It is another object to provide a method and apparatus for fixing or anchoring selected virtual elements to positions relative to the physical set.

It is another object to provide a method and apparatus for grouping the anchored virtual elements together as a collective whole which are then manipulable as a group.

It is another object to provide a method and apparatus for establishing and then manipulating virtual models of physical set elements for proper alignment with respect to the physical set.

It is another object to provide a method and apparatus for displaying calibration markers in the virtual set at locations which correspond to physical locations of real calibration markers in the physical set (and which are utilized for television camera position calibration), to provide visual feedback of proper calibration to the television camera operator.

The present invention is realized in a method and apparatus for creating, positioning and manipulating a garbage matte which obscures everything outside of a three-dimensional physical set or blue stage. Effectively, the garbage matte is a "negative" of a blue stage. What is important is that the garbage matte is created either as a virtual enclosure around all virtual objects in the virtual environment, or simply as a background color of the graphics engine generating the garbage matte. In this way, the garbage matte provides extensions of blue screens which comprise the blue stage, extending all the way around and behind the television cameras. Consequently, a compositor will not include in a composited output image those physical set elements which are masked by the virtual garbage matte. The compositor will replace areas hidden by the garbage matte with image data supplied by the computer image generator which stores the virtual environment.

The presently preferred method of creating a garbage matte includes the steps of creating a virtual model of the physical set (blue stage). The computer image generator utilized to create and store the virtual environment is then utilized to create three-dimensional garbage matte polygons. The three-dimensional polygons are positioned in the virtual environment so as to completely enclose the virtual model of the blue stage and any other objects which exist in the virtual environment, such as in a cube or other appropriate shape. The garbage matte cutout is rendered by eliminating therefrom the shape of the blue stage. Then wherever the garbage matte appears in the compositor, the image seen by the television camera is replaced with an image provided by the computer image generator.

In another aspect of the invention, the garbage matte is alternatively created by assigning a background color to the virtual environment which is interpreted to be the color assigned to the garbage matte. In this way, only the blue stage needs to be modeled, while the polygons for the garbage matte do not. Accordingly, wherever the garbage matte is visible in the compositor, the garbage matte is replaced with an image provided by the computer image generator, and not the television camera.

In another aspect of the invention, the garbage matte can even be created using techniques used in the state of the art. However, the present invention can then take advantage of the inventive concept of anchoring garbage matte polygons to the model of the blue stage and television cameras so that wherever the model of the blue stage and television cameras are moved within the virtual environment, the garbage matte is automatically moved with it so that relative position relationships remain unchanged.

In another aspect of the present invention, it becomes substantially easier to enable video images from a television camera to be combined with virtual objects and backgrounds generated by a computer which creates a virtual environment with which real objects recorded by the television camera can interact. Because the television camera undesirably but often unavoidably will record video images of objects which should not be in the final composited output image, they are masked out by the garbage matte which is then replaced by background provided by the computer image generator.

In another aspect of the invention, virtual objects other than a garbage matte can be anchored to a virtual model of the physical set which is movable within the virtual environment.

In another aspect of the invention, virtual objects which are anchored to the virtual model of the physical set can be grouped together to enable them to be moved as a single unit, or constellation. Furthermore, virtual objects can be "ungrouped" from the constellation and/or the virtual model of the blue stage so that they can be repositioned and then grouped and re-anchored.

In another aspect of the invention, virtual objects can also be non-anchored to the virtual model of the physical set. Accordingly, when the virtual model of the physical set moves within the virtual environment, the non-anchored virtual objects are not dragged around or moved relative thereto. The non-anchored virtual objects are then free and to be moved independently of any other virtual objects.

In another aspect of the invention, the system can be operated in real-time to produce real-time images.

In another aspect of the invention, creating the virtual database is further simplified through the use of specialized virtual image generator control software.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The ultimate objective of the present invention is a method and apparatus for creating, positioning and manipulating a garbage matte and possibly other "anchored" and "non-anchored" virtual scene elements in the virtual environment which includes a model of the physical set. By defining spatial relationships between objects within the virtual environment and the physical set, images seen by television cameras which include objects which are not intended to be part of the composite output image can be manipulated so that the objects never become part of the final composite output image.

What is probably not evident from the background but is learned through utilization of a garbage matte is that creation and placement of the garbage matte presents a difficulty. Specifically, the difficulty arises when the position and orientation of the physical set needs to change relative to the virtual environment, or when the television camera's position needs to change. The problem is that the garbage matte is typically generated by the computer image generator (a graphics supercomputer) in real time. Simultaneously, the same computer image generator graphics engine is typically generating the rest of the virtual environment.

The first inventive concepts of the present invention relate to methods of creating a garbage matte. In a related issue, it will be explained how combining real and virtual scene elements is facilitated by the new garbage matte which can now be created by the various methods of the present invention.

By way of introduction, the presently preferred and the alternative methods of the present invention for creating a garbage matte require the initial step of creating a model of the physical set (blue stage) within the virtual environment stored within a virtual database in the computer image generator. At this point, the methods diverge. However, before providing the embodiments of the present invention, some preliminary issues are first addressed.

First, what is important to understand is that contrary to most virtual objects within the virtual environment, the garbage matte must maintain a specific fixed (anchored) position relative to the physical set. Therefore, the garbage matte must be anchored to a position relative to the physical set regardless of how the virtual environment or virtual objects therein are moving relative to the physical set. Therefore, there is a first class of virtual objects which are relocatable relative to the model of the physical set, while a second class of virtual objects is always be anchored in a fixed position relative thereto. As defined, the garbage matte belongs to the second class of virtual objects.

For example, a director might desire to "move" the physical set to a different location within the virtual environment. It should be recognized that what is really happening is that the effective location of the television camera and blue stage are being moved within the virtual set. Logically, the same physical set with its blue screens is still being utilized. Consequently, the garbage matte must move along with the changing virtual position of the television camera because there has been no change. The physical set is simply "moved" relative to (within) the virtual environment. More simply, the garbage matte must essentially "snug up" to the model of the physical set (blue stage) and remain anchored thereto, regardless of where the location of the physical set is moved within the virtual environment. By anchoring the garbage matte to the model of the physical set, a director is free to move the model within the virtual environment without having to then reposition the garbage matte. The garbage matte has already moved with the model.

Figure 1:
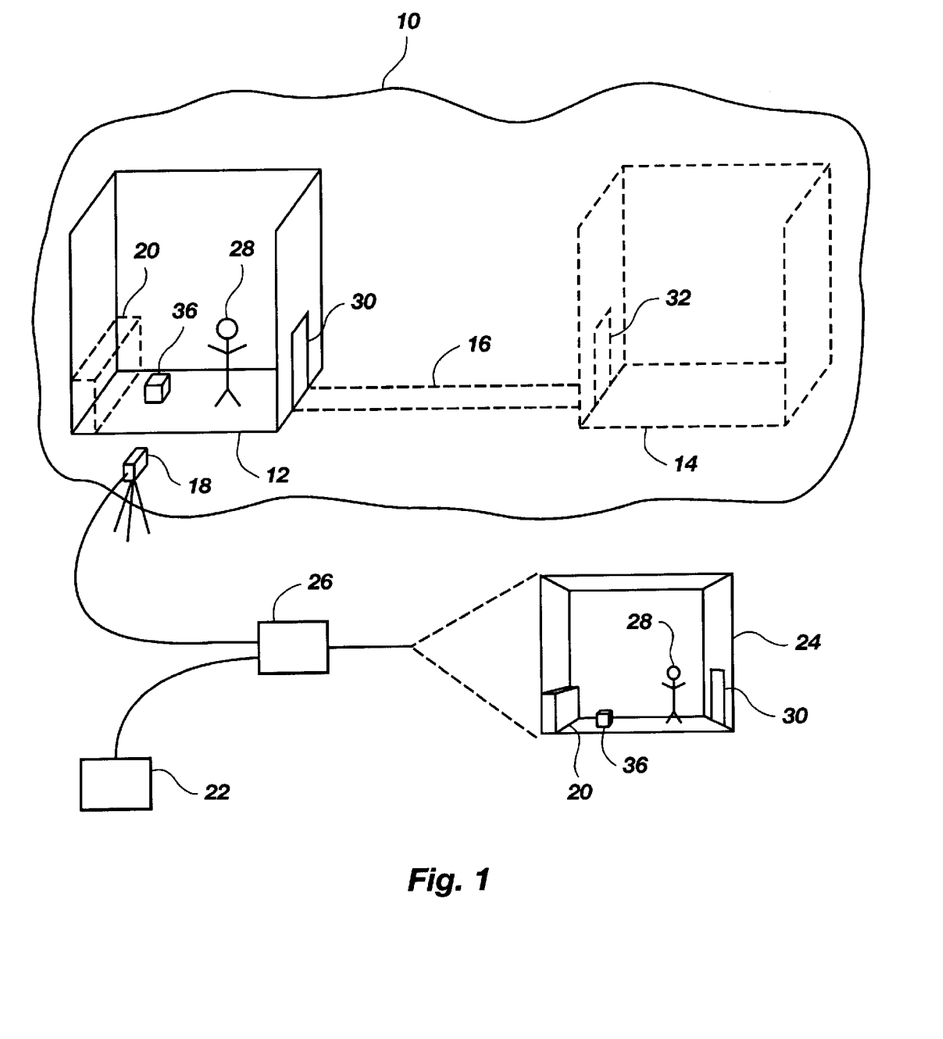
FIG. 1 is a perspective view showing the spatial relationships between a virtual set, a physical set, and a virtual environment as they are conceived in the presently preferred embodiment of the present invention.

This concept is perhaps more easily illustrated utilizing the following figure. FIG. 1 is an illustration of a virtual environment, shown generally at 10. The virtual environment 10 is the combination of a virtual set and a physical set. To understand where the virtual set and the physical set are located relative to this virtual environment 10, it is now asserted that defined mathematically within the memory of a computer image generator as digital data is this virtual environment 10. The entire virtual environment 10, for this example, is comprised of two rooms 12 and 14, with a walkway 16 in between. It is now assumed that at least one television camera 18 is set up so as to be recording images of an interior of room 12. What is critical to understand is that the physical set is only one room, but the single physical set will be used to represent all of the space within the virtual environment 10. Therefore, while the television camera 18 is actually set up in front of the only real physical room (the blue stage and props), the virtual environment 10 is larger.

The television camera 18 is free to record events which occur within the physical set. At the moment, the physical set is being used to represent the room 12. Accordingly, any real objects would be set up as props on the physical set. For example, real object 36 is shown in room 12. Furthermore, the television camera 18 "sees" a person 28 standing or walking through the room 12. However, the television camera 18 does not "see" the virtual object 20 (denoted by dotted lines) because it does not exist on the physical set 12. The virtual object 20 is created by a computer image generator 22. The virtual object 20 is then added to a composite output image 24 by the compositor 26. In the composite output image 24, the person 28, the real object 36, and the virtual object 20 are seamlessly combined in a single composite image 24.

Suppose that the person 28 is now supposed to be seen walking from the room 12, exit through doorway 30, walk along pathway 16, and enter room 14 through doorway 32. It should be remembered that the entire physical set is comprised of a single room, and yet the virtual environment is larger (or smaller). It is asserted that in this example, the computer image generator 22 can also provide background scenes for the different areas of the virtual environment 10 visited by the person 28. The walls and floor of the physical set are comprised of blue screens so that the background can be added by the computer image generator 22.

One further detail is that the physical set, although of finite physical dimensions, will also represent the larger virtual room 14. As will be explained later, the mathematical location of the television camera will be "moved" in the virtual environment 10 so that the television camera 18 believes that it is recording video images originating within room 14. Virtual objects added to room 14 by the computer image generator 22 will then appear as "real" objects in the composited output image 24 from room 14.

The purpose for explaining in some detail how the physical set relates to the virtual environment is to show how the present invention now makes the process described above much easier than can be presently accomplished. Specifically, one of the problems in the process described in a simple form above is that, as previously mentioned, the stage lights above the physical set are often going to be within the television camera's 18 field of view. Furthermore, physical objects to either side of the walls of the room 12 or seen through the doorway 30 will also be seen by the television camera 18. The present invention is a method and apparatus for "virtually" covering up what the television camera 18 should not see. This is made possible by the anchoring of the garbage matte to the model of the physical set.

Moving to the presently preferred embodiment of the present invention, implementing the concept of the garbage matte cutout being a "negative" image of the blue stage is made substantially easier in comparison to the prior art. Instead of creating garbage matte polygons which abut edges of the model of the blue stage, this embodiment is implemented by virtually surrounding or enclosing within a virtual garbage matte all objects found in the virtual environment, including the model of the physical set. Then by assigning the garbage matte a particular color appropriate for the compositing equipment being used, this color is always replaced by images provided by the computer image generator in the final composite output image.

Figure 2:
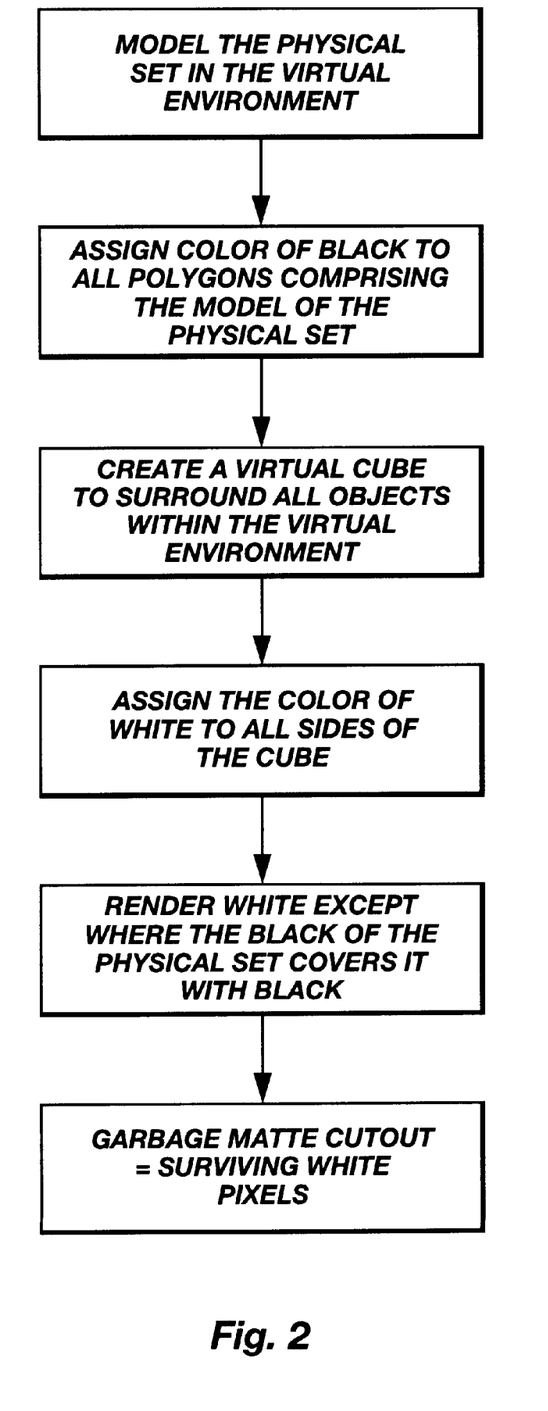
FIG. 2 is a flowchart of a method of the presently preferred embodiment constructed in accordance with the principles of the present invention, where the garbage matte is created using a cube which surrounds all objects within the virtual database, including the model of the physical set which is rendered in black polygons.

With this summary in mind, the process is as follows. The first step in the process as shown by the flowchart of FIG. 2 is to model the physical set (i.e. the blue stage) within the computer image generator. This is accomplished by creating the walls, floors and ceiling, if any, of all elements of the blue stage as a plurality of polygons which are grouped together so as to be movable as a single unit. This model of the blue stage is constructed using any appropriate three-dimensional object generating software. The model will then exist as digital data which is representative of the blue stage.

It should be realized that modeling of the blue stage is often done so that the director can more readily visualize the location of the physical set within the virtual environment. The model is also generally not difficult to construct because the physical set is typically a plurality of planar or otherwise uncomplicated walls, floors and ceilings.

The polygon model of the blue stage is also assigned a color. The polygons are preferably assigned the color of black. As is understood by those skilled in the art, this color is designated by assigning the polygons an appropriate red/green/blue (RGB) value (RGB=0, 0, 0). Before proceeding with the explanation, the references to color are typically integral to the compositor being used. Therefore, while this alternative embodiment will use the colors of black and white, any colors can be substituted which enable the compositor to function as required by the present invention. However, it is generally the case that the selected colors are opposites or negatives of each other, which is easily understood when using black and white.

The next step in the process shown in the flowchart of FIG. 2 is to model a large cube of polygons. For simplicity, the shape of a cube is selected, but other three-dimensional shapes can be selected but should be as simple as possible. The cube should be constructed large enough so as to contain within it the entire physical stage, plus any area within which the television camera might move. In essence, the cube typically surrounds the entire physical set.

The cube is then designated as white. Those skilled in the art will understand that this is accomplished by designating the RGB values appropriately (RGB=255, 255, 255). This large cube is the garbage matte. The critical step in the process of creating a universal garbage matte is to have the computer image generator render white except where the black of the stage model (physical set) covers it with black. The essence of the invention is thus to realize that the surviving white pixels thus depict the shape of the garbage matte cutout. Stated differently, the garbage matte cutout is created by rendering the model of the physical set from the camera's current position. Accordingly, the model of the physical set cuts a "hole" in the garbage matte, leaving a surviving garbage matte cutout which is the negative of the model of the physical set.

Figure 3:
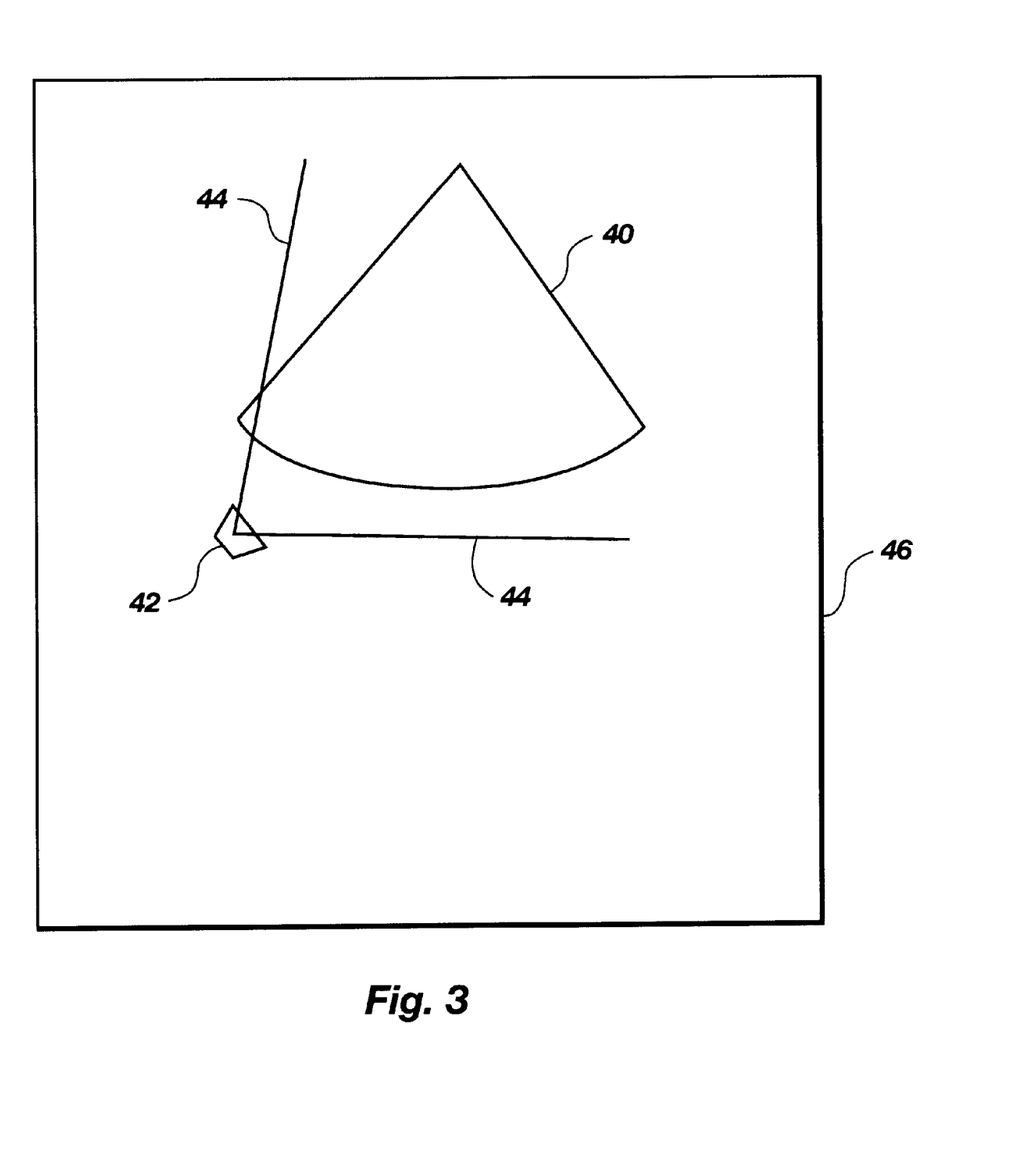
FIG. 3 is a top view of a virtual set illustrating a blue stage, a television camera, lines which depict the field of view of the television camera, and a white cube outline representative of the garbage matte created using the flowchart of FIG. 2.

The concept above is depicted in FIG. 3. FIG. 3 shows a blue stage 40, a television camera 42, lines 44 which depict the field of view of the television camera 42, and a white box (cube) outline 46 (unfortunately but necessarily rendered with black lines). The white box is the garbage matte 46. It should be realized that the view shown in FIG. 3 is a top view of a virtual set.

As a practical matter, the garbage matte is typically generated by a separate channel of the computer image generator. However, in an attempt to reduce costs, and especially for a computer image generator which only has a single output channel, it is possible to create the garbage matte in a low-cost workstation, typically much lower in cost than a second image generator channel.

Before discussing an alternative embodiment of a method for creating the garbage matte, a significant advantage of being able to anchor virtual objects to other virtual objects will be explained. The ability to create a garbage matte which is anchored in place relative to the physical set, and to also be able to create other virtual objects which are not anchored to the physical set raises an important issue. Specifically, the present invention advantageously provides the ability to handle movement of virtual objects when those virtual objects include garbage mattes and other objects. Therefore, the present invention includes the ability to "group" and "ungroup" virtual objects. For example, consider a set of virtual objects which have been grouped together so as to be movable as a single object within the virtual environment. As an example, suppose a first virtual object must be moved relative to the model of the physical set to which it is anchored. The first virtual object is "ungrouped" from the model of the physical set, and then repositioned relative thereto. The first virtual object is then "grouped" together again to the model of the physical set so that the model can be repositioned within the virtual environment without readjustment to the relative positions of the first virtual object.

Figure 4:
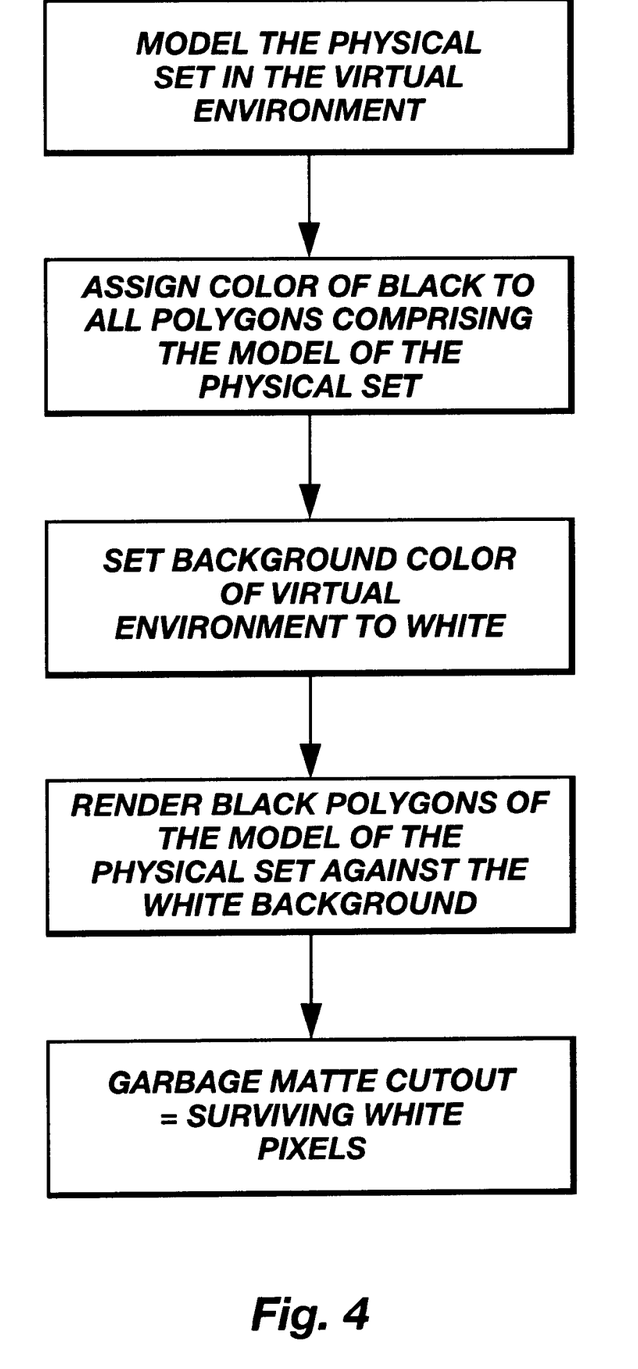
FIG. 4 is a flowchart for creation of an alternative embodiment of the present invention, where the garbage matte is created using a white background color of the virtual environment where the model of the physical set is rendered in black polygons.

While the presently preferred embodiment functions well, an alternative embodiment is also able to achieve the advantages of the present invention. This alternative embodiment is realized by removing the cube surrounding all of the objects within the virtual environment. In other words, the alternative embodiment takes advantage of the concept of just assigning a "garbage matte" color as the background color of the graphics engine generating the garbage matte. In this way, the enclosure of the previous alternative embodiment does not have to be generated. Accordingly, whenever the color assigned to the background of the graphics engine generating the garbage matte is visible in the compositor, it is replaced with images provided by the computer image generator. The alternative embodiment is shown in the flowchart of FIG. 4.

In this alternative embodiment, a garbage matte generating system can be comprised of a networked Windows NT workstation equipped with three-dimensional graphics acceleration capabilities. Optionally, it can also be equipped with a low cost frame buffer which is capable of resizing image data from resolutions which are less than NTSC or PAL to NTSC or PAL standard resolutions.

Accordingly in the presently preferred or the alternative embodiment, television camera tracking information which includes the television camera's XYZ position information, television camera orientation (pan, tilt and roll) and the television camera's lens zoom state are passed to a workstation (such as the Windows NT workstation). This information is typically passed via RS422, Ethernet or some other relatively and comparably fast data communication connection. A real time three-dimensional graphics program receives the television camera information and then creates a viewport matrix from the input television camera data, by methods which are known to those of ordinary skill in the art.

The next step is that the model of the physical set is rendered into the resulting viewport. The model is comprised of the black colored "blue stage" as shown in FIG. 4, except that instead of the white cube 46, a white background color is assigned in the virtual environment. Because the model is a relatively simple one, it does not require lighting calculations, texturing, anti-aliasing or Z-buffer range sorting as would be required if the model were trying to be rendered so as to appear life-like.

Once the model is rendered by the computer image generator, the next step is to transfer the information to a frame buffer in the presently preferred embodiment through a scan converter. In the alternative, it can be copied directly into frame buffer memory.

Optionally, if the image needs to be resized to meet standard video resolutions, the frame buffer then performs additional processing as necessary.

The output from the frame buffer is a black and white image which is transferred in the presently preferred embodiment of the invention to a matte channel of a chromakey compositor as a garbage matte signal.

The steps of rendering and displaying the image are continuously repeated at a presently preferred rate of at least 30 frames per second or better to produce a generally flicker-free image.

As a practical matter, bottlenecks in the rendering of the composite output image are generally a function of the number and complexity of polygons, and the number of pixels which must be drawn. The alternative embodiment is generally comprised of simpler models with less complex and/or fewer polygons. Furthermore, by first rendering in a small window, and then using dedicated hardware to scale up the image to perhaps fill a computer display, the method becomes a relatively lower cost method for generating the composite output image.

Having set forth the methods for creating the garbage matte, it is useful to consider more specifically the different classes of virtual objects. Specifically, the second class of virtual objects included those elements which should be "anchored" to the blue stage. Anchored virtual scene elements would include but not be limited to the following:

The main garbage matte (whether two-dimensional or the three-dimensional wrap-around structure).

Any additional garbage matte polygons used to hide undesirable physical items which fall within the scene (to cover a light which hangs down into the blue stage area).

A model of the physical set floor, used as a temporary visualization aid in planning television camera positions and angles, by viewing where the blue stage floor is located relative to the virtual environment.

Other calibration markers which might be used to indicate particular locations on the physical set.

For example, anchored markers could be used to depict known points in a television camera calibration, such that the television camera operator can see that the markers are in the correct locations relative to the physical set.

Figure 5:
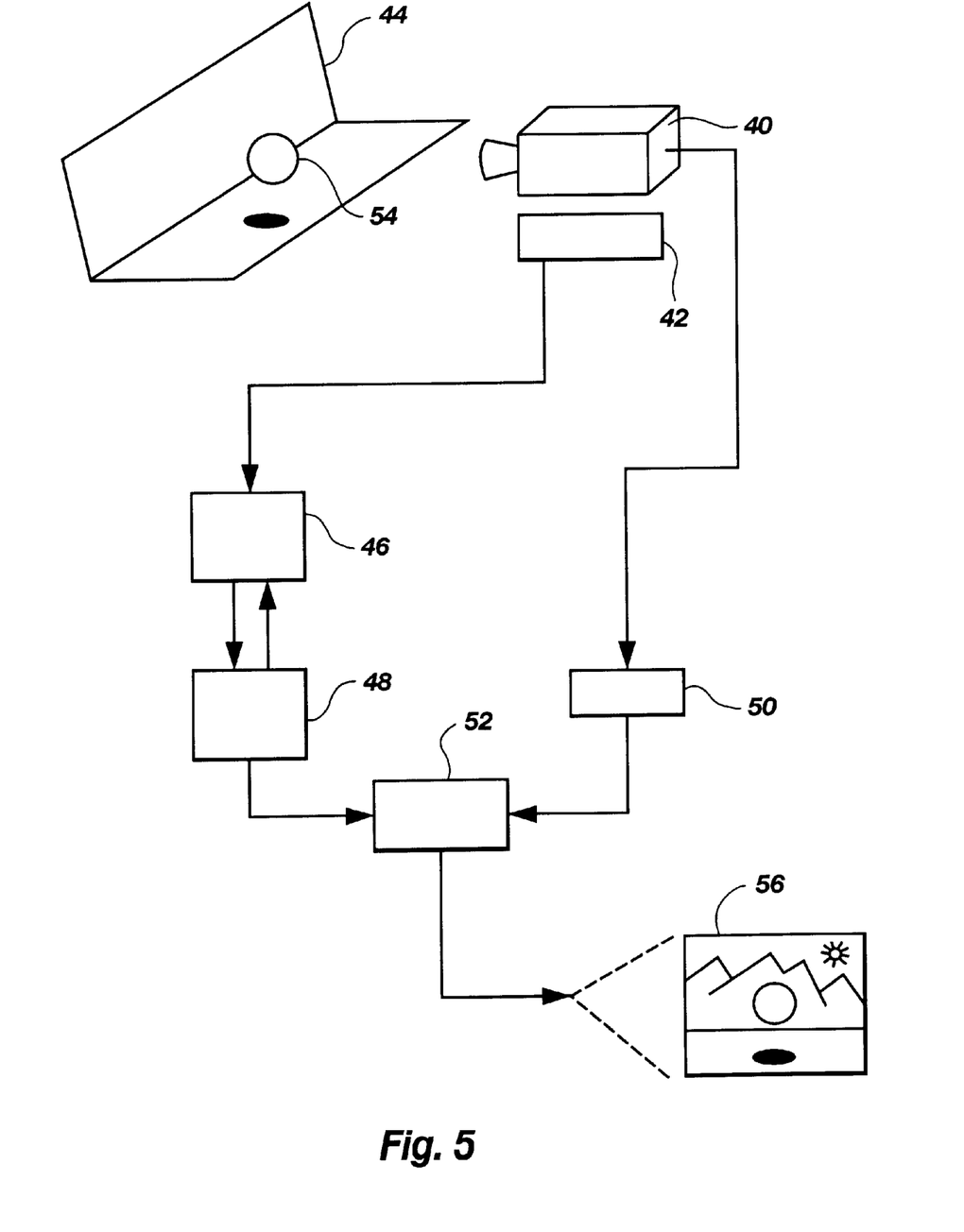
FIG. 5 is a combination of a perspective view of a blue stage and a graphic image output in combination with a block diagram of the components of a virtual set system which utilize the present invention to realistically combine live-action objects with virtual objects.

Turning now to implementation details, the present invention described above is realized utilizing the system as described in FIG. 5. The elements of the invention thus include a television camera 40, a television camera tracker 42, a blue stage 44, a control computer 46 running control software, a graphics supercomputer 48, a video delay unit 50, and a compositor 52.

The operation of these systems was already described as being explained in greater detail in two previously filed patent applications. However, a brief explanation of the system described in FIG. 5 is useful to place the present invention in perspective.

The television camera 40 is linked to the television camera tracker 42 so that the pan and tilt, and the zoom and focus of a lens of the television camera 40 can be monitored. In this way, the part of the blue stage 44 which is seen by the television camera 40, and from what angle, can be known by the system. In this way, the graphics supercomputer 48 and the television camera 40 are always "seeing" the same thing on the blue stage 44. By enabling each move of the television camera 40 to be converted into positional information for the graphics supercomputer 48, every aspect of the virtual set can be recreated to appear exactly as it would if viewed through the television camera 40.

Synthesizing the virtual environment in a convincing manner requires the ability to update the virtual objects at a predictable and steady rate. To display a smooth, continuous sequence of images, the graphics supercomputer 48 recreates (renders) an entirely new image of the virtual objects preferably at the rate of 30 times per second (the same rate at which a broadcast television camera typically operates). This enables virtual objects and live talent to interact at the same speed, or in real time, when they are layered together in the compositor 52. It is essential to generate images and corresponding textures and movements at a dependable, broadcast rate of speed without fluttering or skipping a frame.

The compositor 52 enables digital images to be layered together in such as way as to create a single, composite picture. Background scenes, animated virtual elements and objects, and live talent are seamlessly merged into a believable broadcast image.

Therefore, an example of how the system of FIG. 5 operates is as follows. First, a real object 54 is located within the field of view of the television camera 40 and on the blue stage 44. The television camera 40 records images of the real object 54 and transmits the images preferably at the rate of 30 frames per second to a video delay unit 50. The video delay unit 50 is utilized because billions of computer graphics operations are necessary to render a single image. As an image is created, there is a very short delay between the video coming out of the television camera 40 and the three-dimensional virtual imagery being generated by the graphics supercomputer 48. To correct this delay, video and audio delays are used to synchronize both sets of images as they feed into the compositor 52. The length of the delay is based on the television camera tracker 42 and the capabilities of the graphics supercomputer 48, and may vary in frames per second from system to system.

The television camera tracker 42 sends information to the control computer 46 running control software. Information from the control computer 46 enables the graphics supercomputer 48 to know what the television camera 40 is "seeing", and thus enables it to generate all the virtual background and objects required and in the correct locations relative to the real object 54.

Finally, the compositor combines the layers of digital images generated by the graphics supercomputer 48 with the delayed video images from the television camera 40 to produce a final composited output image 56.

To put the present invention in perspective, it is important to realize that it is implemented within or as part of the control computer 46 and the graphics supercomputer 48 and the software running thereon. However, it should also be apparent that this should not be considered limiting, as the implementation details including where components are located can be altered.

There are other implementation details which are also important to know. For example, the presently preferred approach for accomplishing the anchoring functionality is as follows. First, the location of each television camera in the physical set is measured by a television camera tracker. This location and orientation is measured relative to a fixed point in the physical set and is referred to as the studio origin. In relation to the virtual set, the control computer 46 enables a user of the system to control an offset between the studio's origin and the virtual set origin stored in a database. Furthermore, an adjustable orientation of the virtual set is provided so that these user-entered values can be added to the position and bearing of all virtual cameras controlled by the television camera trackers, thus effectively moving the virtual cameras within the virtual database.

If no other steps were taken, this would result in movement of all virtual objects relative to the television cameras, whether the virtual objects were anchored or non-anchored. Therefore, a corresponding adjustment is made in the positions and bearings of all anchored virtual objects, which results in the virtual cameras and all the non-anchored virtual objects being moved around as a fixed group (constellation) in relation to each other. Thus, the position of the anchored virtual objects relative to the cameras (virtual and real) is maintained while the rest of the virtual environment is adjusted to achieve the desired alignment.

The control computer software can also select all anchored objects and move them collectively utilizing any appropriate graphical user interfaces devices, such as a mouse.

It should also be mentioned that the control computer software also provides for separate adjustments in the positions and orientations of the anchored virtual objects. In this way, they can be repositioned relative to one another (and accordingly in relation to the physical set) as desired.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for generating a garbage matte which masks undesired objects in view of a television camera transmitting video images of a physical set, said video images being combined with virtual images to thereby generate a composite output image without the undesired objects, said method comprising the steps of:

(1) modeling the physical set in a virtual environment;

(2) generating a virtual garbage matte enclosure in the virtual environment which surrounds the model of the physical set; and (3) rendering the model of the physical set from the television camera's current position to thereby remove the model of the physical set such that a resulting shape for the garbage matte is a negative image of the model of the physical set.

2. The method as defined in claim 1 wherein the method further comprises the step of anchoring the garbage matte and the model of the physical set to a relative position of the television camera so that the garbage matte is always positioned in a same relative position with respect to the model of the physical set and the television camera, regardless of where the television camera and the model of the physical set are relocated within the virtual environment or repositioned with respect to an original orientation.

3. The method as defined in claim 1 wherein the method further comprises the step of including within the virtual garbage matte enclosure all virtual objects which are defined within a virtual object database which corresponds to virtual objects which can appear within the virtual environment.

4. The method as defined in claim 1 wherein the method further comprises the steps of:

(1) generating the model of the physical set utilizing at least one polygon which is defined in the virtual environment; and (2) generating the virtual garbage matte enclosure utilizing a plurality of polygons which are defined in the virtual environment.

5. The method as defined in claim 4 wherein the method further comprises the step of anchoring the plurality of polygons which define the physical set so that they can be manipulated as a single unit.

6. The method as defined in claim 4 wherein the method further comprises the steps of:

(1) assigning a first color to the at least one polygon which defines the physical set; and (2) assigning a second color to the plurality of polygons which define the virtual garbage matte enclosure.

7. The method as defined in claim 6 wherein the method further comprises the step of selecting a second color for the garbage matte according to a compositor which utilizes the second color for masking out undesired objects seen by the television camera, and the first color is utilized by the compositor as representing areas of the composite output image where video signals should come from the television camera.

8. The method as defined in claim 7 wherein the method further comprises the steps of:

(1) assigning the first color a red/green/blue (RGB) value of white; and (2) assigning the second color an RGB value of black.

9. The method as defined in claim 6 wherein the method further comprises the step of rendering in the virtual environment the garbage matte from the virtual garbage matte enclosure by rendering the first color everywhere within the garbage matte except where the second color pixels of the model of the physical set cover the garbage matte.

10. The method as defined in claim 1 wherein the method further comprises the step of providing a user interactive method of manipulating a position and an orientation of a virtual camera and the virtual models of all anchored objects to thereby maintain the anchored objects in desired relative locations.

11. The method as defined in claim 2 wherein the method further comprises the step of generating at least one virtual object which is not anchored to a position relative to the model of the physical set, such that moving the model of the physical set within the virtual environment does not cause a corresponding relative movement of the at least one virtual object.

12. The method as defined in claim 1 wherein the method further comprises the step of supplying virtual images to replace areas of the composite output image which show the garbage matte.

13. The method as defined in claim 1 wherein the method further comprises the step of generating at least one new garbage matte polygon separate from the garbage matte to thereby mask at least one undesirable object which is completely within boundaries of the model of the physical set.

14. The method as defined in claim 1 wherein the method further comprises the step of generating at least one object within the virtual environment which is anchored to the physical set.

15. The method as defined in claim 1 wherein the method further comprises the step of providing a user interactive method of manipulating a position and an orientation of the model of the physical set with respect to the virtual environment.

16. The method as defined in claim 1 wherein the method further comprises the step of generating a plurality of objects within the virtual environment which are anchored to the physical set.

17. The method as defined in claim 16 wherein the method further comprises the step of providing a user interactive method of manipulating a position and an orientation of each of the plurality of objects with respect to the plurality of objects which remain anchored to each other.

18. A method for generating a garbage matte which masks undesired objects in view of a television camera transmitting video images of a physical set, said video images being combined with virtual images to thereby generate a composite output image without the undesired objects, said method comprising the steps of:

(1) modeling the physical set in a virtual environment;

(2) assigning a first color to the model of the physical set;

(3) assigning a second color as a background color of a graphics engine generating the garbage matte; and (4) not changing the second color anywhere except where the first color covers the background from the television camera's current position to thereby remove the model of the physical set such that a resulting shape for the garbage matte is a negative image of the model of the physical set.

19. The method as defined in claim 18 wherein the method further comprises the step of anchoring the garbage matte and the model of the physical set to a relative position of the television camera so that the garbage matte is always positioned in a same relative position with respect to the model of the physical set and the television camera, regardless of where the television camera and the model of the physical set are relocated within the virtual environment or repositioned with respect to an original orientation.

20. The method as defined in claim 18 wherein the method further comprises the step of generating the model of the physical set utilizing at least one polygon which is defined in the virtual environment.

21. The method as defined in claim 20 wherein the method further comprises the step of anchoring the plurality of polygons which define the physical set so that they can be manipulated as a single unit.

22. The method as defined in claim 18 wherein the method further comprises the step of selecting a second color for the background according to a compositor which utilizes the second color for masking out undesired objects seen by the television camera, and the first color is utilized by the compositor as representing areas of the composite output image where video signals should come from the television camera.

23. The method as defined in claim 22 wherein the method further comprises the steps of:

(1) assigning the first color a red/green/blue (RGB) value of white; and (2) assigning the second color an RGB value of black.

24. The method as defined in claim 18 wherein the method further comprises the step of providing a user interactive method of manipulating a position and an orientation of a virtual camera and the virtual models of all anchored objects to thereby maintain the anchored objects in desired relative locations.

25. The method as defined in claim 18 wherein the method further comprises the step of generating at least one virtual object which is not anchored to a position relative to the model of the physical set, such that moving the model of the physical set within the virtual environment does not cause a corresponding relative movement of the at least one virtual object.

26. The method as defined in claim 18 wherein the method further comprises the step of supplying virtual images to replace areas of the composite output image which show the garbage matte.

27. The method as defined in claim 18 wherein the method further comprises the step of generating at least one new garbage matte polygon separate from the garbage matte to thereby mask at least one undesirable object which is completely with in boundaries of the model of the physical set.

28. The method as defined in claim 18 wherein the method further comprises the step of generating at least one object within the virtual environment which is anchored to the physical set.

29. The method as defined in claim 18 wherein the method further comprises the step of providing a user interactive method of manipulating a position and an orientation of the model of the physical set with respect to the virtual environment.

30. The method as defined in claim 18 wherein the method further comprises the step of generating a plurality of objects within the virtual environment which are anchored to the physical set.

31. The method as defined in claim 30 wherein the method further comprises the step of providing a user interactive method of manipulating a position and an orientation of each of the plurality of objects with respect to the plurality of objects which remain anchored to each other.

32. A method for manipulating virtual objects which at least include a model of a physical set, and at least one garbage matte which masks undesired objects in view of a television camera transmitting video images of a physical set, said video images being combined with virtual images to thereby generate a composite output image without the undesired objects, said method comprising the steps of:

(1) modeling the physical set in a virtual environment;

(2) generating a garbage matte which is a negative image of the model of the physical set;

(3) anchoring the garbage matte to the model of the physical set and a model of the television camera to form a single unit of virtual objects; and (4) manipulating a location of the single unit within the virtual environment without disturbing relative positions such that the virtual objects within the single unit are always positioned in a same relative position.

33. The method as defined in claim 32 further comprising the steps of:

(1) unanchoring the virtual objects within the single unit;

(2) repositioning at least one of the virtual objects with respect to the other virtual objects; and (3) anchoring the virtual objects within the single unit.

34. The method as defined in claim 33 further comprising the step of creating at least one additional virtual object within the virtual environment and adding it to the single unit.

35. A system for generating a garbage matte which transmitting video images of a physical set, said video images being combined with virtual images to thereby generate a composite output image without the undesired objects, said system comprising:

(a) the television camera for creating video images of the physical set;

(b) a video delay means for delaying the video images to enable synchronization of the video images and the virtual images;

(c) a television camera tracker associated with the television camera for monitoring position information of the television camera;

(d) a control computer in communication with the television camera tracker for receiving the position information and for executing software which controls functions of the system;

(e) a graphics computer coupled in communication with the control computer for generating a virtual environment from which the virtual images are taken for combining with the video images to generate the composite output image, wherein a model of the physical set is generated in the virtual environment, and wherein a virtual three dimensional garbage matter enclosure is generated to thereby surround corresponding objects in the physical set that are not to be seen in the composite output image; and (f) a compositor which receives the video images from the video delay means and the graphics computer to thereby generate the composite output image.

* * * * *